United States Patent [19]

Nakamura et al.

[11] Patent Number: 4,539,796

[45] Date of Patent: Sep. 10, 1985

[54] APPARATUS FOR MANUFACTURING SAUSAGES OR THE LIKE

[75] Inventors: Minoru Nakamura, Tokyo; Minoru Kasai, Ebina, both of Japan

[73] Assignee: Hitec Co., Ltd., Tokyo, Japan

[21] Appl. No.: 359,408

[22] Filed: Mar. 18, 1982

[51] Int. Cl.³ .................................................. B65B 43/48
[52] U.S. Cl. ............................................ 53/576; 17/33; 53/567
[58] Field of Search ............... 53/575, 576, 577, 567; 17/33, 35, 36, 37, 40, 41, 42

[56] References Cited

U.S. PATENT DOCUMENTS

| | | | |
|---|---|---|---|
| 3,115,668 | 12/1963 | Townsend | 17/33 |
| 3,191,222 | 6/1965 | Townsend | 17/33 |
| 3,694,853 | 10/1972 | Greider | 17/33 |
| 3,964,128 | 6/1976 | Townsend et al. | 17/33 |
| 4,032,049 | 6/1977 | Roberts | 17/40 |
| 4,091,505 | 5/1978 | Müller et al. | 17/33 |
| 4,112,546 | 9/1978 | Müller | 17/33 X |

Primary Examiner—John Sipos
Assistant Examiner—Donald R. Studebaker
Attorney, Agent, or Firm—Flynn, Thiel, Boutell & Tanis

[57] ABSTRACT

An apparatus for manufacturing sausages or the like comprises a stuffer tube for stuffing sausage dough into a casing, a pump for supplying the sausage dough into the stuffer tube, a casing pusher for propelling the casing, a chuck for receiving the stuffed casing discharged out of an end of the stuffer tube, the chuck being rotatable and frictionally engageable with the stuffed casing, and a linking device coacting with the chuck for twisting the stuffed casing as pushed out of the chuck into a chain of links. There are provided speed changing devices such as conical pulleys and endless belts trained therearound for changing the speeds of operation of the pump and the linking device, respectively. The casing pusher may be actuated either manually or automatically by a fluid cylinder. Manual actuation of the casing pusher permits less rigid collagen casings or irregular animal casings to be propelled without the risk of getting ruptured while being stuffed with sausage batter. The stuffer tube may be rendered rotatable or nonrotatable by a clutch actuatable by a selection lever.

1 Claim, 13 Drawing Figures

APPARATUS FOR MANUFACTURING SAUSAGES OR THE LIKE

BACKGROUND OF THE INVENTION

The present invention relates to an apparatus for manufacturing sausages or the like, and more particularly to a versatile apparatus for manufacturing sausages or the like at high speeds with a wide variety of sausage casings usable.

Various fully automatic, semiautomatic, and versatile apparatus have been used in the art for manufacturing sausages or the like with a variety of sausage casings such as animal casings and artificial casings. However, no single sausage manufacturing apparatus has been known which can produce sausages or the like at high rates of production using all kinds of sausage casings including those having irregular diameters, volumes, and rigidities.

SUMMARY OF THE INVENTION

It is an object of the present invention to provide an apparatus for manufacturing sausages at high speeds using casings having different diameters and volumes, such as sheep guts and hog guts (called "natural casings") with meat stuffed therein with uniform density.

Another object of the present invention is to provide an apparatus for manufacturing sausages at high speeds using casings having uniform diameters and volumes, such as cellulosic casings and collagen casings (called "artificial casings").

Still another object of the present invention is to provide an apparatus for manufacturing sausages or the like, which apparatus can use a wide variety of casings that are commercially available today.

A still further object of the present invention is to provide an apparatus for manufacturing sausages or the like having uniform weights and volumes.

A still further object of the present invention is to provide an apparatus which is easily controllable for manufacturing sausages or the like at high rates of production.

An apparatus for manufacturing sausages or the like comprises a stuffer tube for stuffing sausage dough into a casing, a pump for supplying the sausage dough into the stuffer tube, a casing pusher for propelling the casing, a chuck for receiving the stuffed casing discharged out of an end of the stuffer tube, the chuck being frictionally engageable with the stuffed casing, a linking device for twisting the stuffed casing as pushed out of the chuck into sausage links, a device for changing the speed of operation of the pump, and a device for changing the speed of operation of the linking device. The casing pusher may be actuated either manually or automatically by a cylinder. The stuffer tube may be rendered rotatable or nonrotatable by a clutch. Manual actuation of the casing pusher permits less rigid collagen casings or irregular natural casings to be propelled without the risk of getting damaged while being stuffed with sausage dough.

The above and other objects, features and advantages of the present invention will become more apparent from the following description when taken conjunction with the accompanying drawings.

BRIEF DESCRIPTION OF THE DRAWINGS

FIG. 1 is a schematic plan view of a conventional apparatus for manufacturing sausages or the like;

DETAILED DESCRIPTION

A conventional apparatus for manufacturing sausages or the like will first be described with reference to FIGS. 1 through 5. The prior apparatus as shown is known as a "fully automatic machine" and is a single-purpose machine, as disclosed in Japanese Patent Publications Nos. 40-27509 and 41-5899, corresponding to U.S. Pat. Nos. 3,115,668 and 3,191,222, respectively, in which a casing pusher is automatically driven by a mechanical means.

Figure 1:
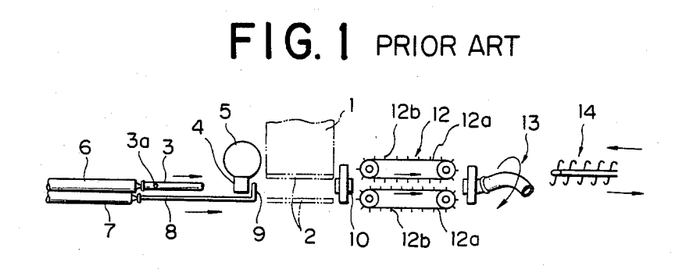
Figure 2:
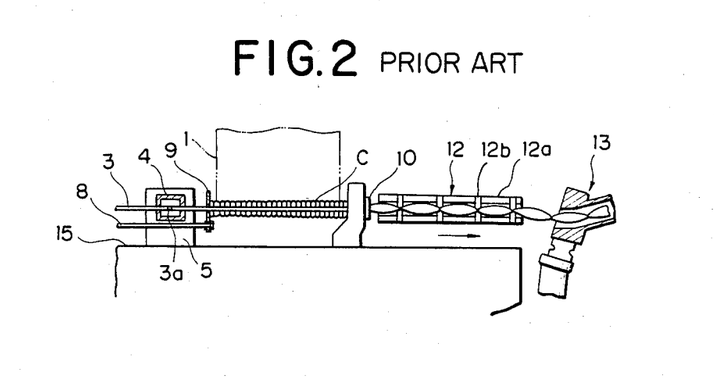
FIG. 2 is a fragmentary front elevational view of the apparatus illustrated in FIG. 1.
Figure 3:
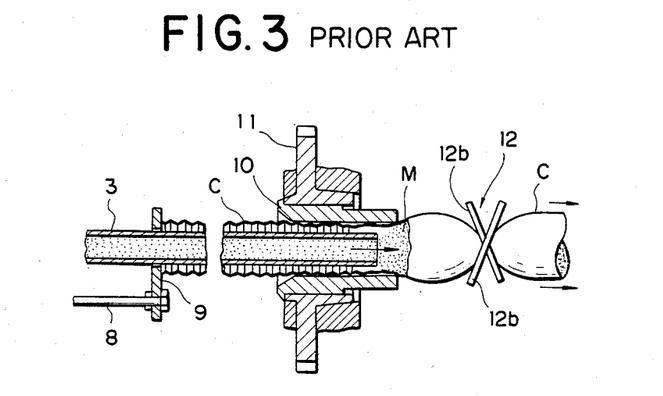
FIG. 3 is an enlarged longitudinal cross-sectional view of a portion of the apparatus shown in FIGS. 1 and 2, the view being illustrative of parts as they are being in operation.

As shown in FIGS. 1 through 3, the apparatus comprises a casing hopper 1 through which a cylindrical sausage casing C (FIG. 2) is rollingly supplied, a pair of casing clamps 2 for clamping the supplied casing C on its opposite sides, and a stuffer tube 3 for stuffing a sausage material M such as chopped meat into the casing C, the stuffer tube 3 being insertable into the casing C. A stuffer block 4 has a hole through which the stuffer tube 3 can pass and another hole (not shown) communicating with a stuffer pump 5 which comprises a gear pump as described later. The material M to be stuffed is discharged from the pump 5 through the block 4 into the stuffer tube 3 via an opening 3a in a wall thereof. The stuffer tube 3 is connected to a piston rod of the cylinder 6, and can be driven to the right (FIG. 1) by the cylinder 6. A casing pusher cylinder 7 is disposed adjacent to the cylinder 6 in parallel thereto and has a piston rod to which there is attached a casing pusher rod 8 having on its distal end a casing pusher 9.

A casing chuck 10 is located adjacent to one side wall of the casing hopper 1 for gripping and rotating the casing C about its own axis, the casing chuck 10 being rotatably drivable in concentric relation to the stuffer tube 3 and the cylinder 6. As shown in FIG. 3, the casing chuck 10 is fixed to and disposed in a boss of a gear 11 which is rotatable by a drive unit (not shown). The casing pusher 9 is movable between the stuffer block 4 and the casing chuck 10. In operation, the casing pusher 9 engages a rear or trailing end of the casing C and pushes the casing C rightward as shown in FIG. 1.

A linking device 12 serves to coact with the casing chuck 10 to twist the casing C with the mass M encased therein at certain intervals to produce a chain of linked sausages. The linking device 12 comprises a pair of parallel chains 12a each having a plurality of vanes 12b disposed at spaced intervals. The casing C is sandwiched or squeezed between confronting pairs of such vanes 12b as the casing C travels along a path between the chains 12a. A looper 13 positioned downstream of the linking device 12 serves to hook the chained sausages on a loop conveyor 14.

Figure 4:
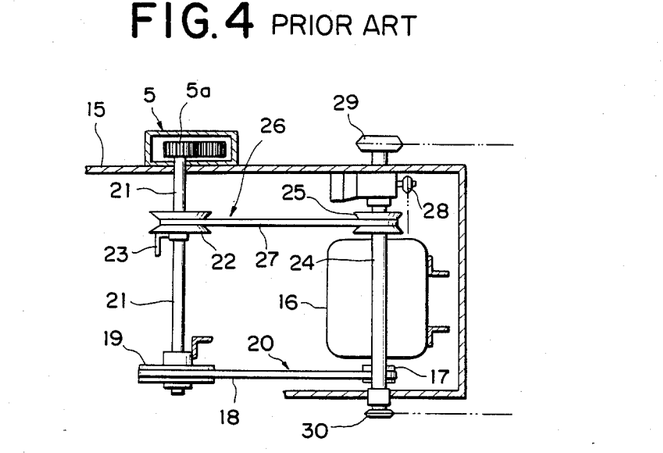
FIG. 4 is a front elevational view of a central portion of a power transmission mechanism in the apparatus shown in FIG. 1.

FIG. 4 shows a power transmission or drive mechanism for the apparatus illustrated in FIGS. 1 through 3. The apparatus has a frame (FIGS. 2 and 4) in which there is mounted an electric motor 16 (FIG. 4) having a motor shaft with a drive pulley 17 affixed thereto. A main speed reducer 20 is constituted by an endless belt 18 trained around the drive pulley 17 and a driven pulley 19 mounted on a pump shaft 21 rotatably journalled on the frame 15. A conical pulley 22 is mounted on the pump shaft 21 and has a speed change lever 23. The pump shaft 21 is coupled through a clutch (not illustrated) to one of gears 5a of the pump 5 mounted on the frame 15. The pump shaft 21 is driven at a reduced speed by the driven pulley 19 so that the driving speed is constant.

A main shaft 24 is rotatably journalled on the frame 15 and extends parallel to the pump shaft 21. The main shaft 24 supports thereon a conical pulley 25 around which there is trained a V-belt 27 which travels around the conical pulley 22. The conical pulleys 22, 25 and the V-belt 27 jointly constitute a stepless speed change device 26. The main shaft 24 serves to supply power to all moving parts of the apparatus except the pump 5. More specifically, the main shaft 24 drives a chain sprocket 28 for rotating the casing chuck 10, a chain sprocket 29 for driving the linking device 12, and a chain sprocket 30 for driving the looper 13 and the loop conveyor 14.

The fully automatic apparatus thus constructed is designed for mass-producing sausages or the like of uniform volumes using hard cellulosic casings or artificial casings. The apparatus is advantageous in that the casing can automatically be propelled by the cylinder 7, and the stuffer tube 3 is prevented from being rotated about its own axis. However, the apparatus also suffers a disadvantage in that it fails to manufacture sausages or the like of irregular volumes using natural or animal casings, or stated otherwise, it can produce only sausages or the like of even volumes using hard cellulosic casings. The reasons for such a disadvantage will be described with reference to FIGS. 1 through 3.

While the material M is being stuffed into the casing C, and the stuffed casing C is being twisted into sausage links of uniform lengths, it is necessary that the stuffed casing C be moved out of the casing chuck 10 toward the linking device 12 without being broken, the casing C filled with the material be rotated by the casing chuck 10, and the casing C with no material stuffed therein should not be entangled around the stuffer tube 3.

If other casings than hard cellulosic casings were used on the fully automatic apparatus, the following difficulties would be likely to arise:

Automatic propulsion of casings would fail to effect coordinated control of the speed and force with which casings are to be propelled, and a gathered or folded end portion of a casing would not engage the casing chuck under desired conditions, with the result that the first requirement described above could not be met. With the stuffer tube being nonrotatable, the folded end portion of the casing rotating with the casing chuck would tend to get stuck around the stuffer tube with the result that the third requirement described aboe could not be met.

The mechanism or manner in which a material is stuffed into a casing as the latter is twisted into links is described in detail in the Japanese Patent Publications Nos. 40-27509 and 41-5899. No description thereof will be given as it has no bearing on the present invention.

The fully automatic apparatus which undergoes the foregoing defects is used only for producing sausages having hard cellulosic casings, and hence cannot cope with changes in management policies, production plans, and demands for different kinds of sausages. The term "hard cellulosic casings" used herein is meant to include all artificial casings that are equal in mechanical adaptability to the hard cellulosic casings.

Conventional sausage manufacturing apparatus including fully automatic, semiautomatic, and versatile apparatus are disadvantageous in that they cannot produce sausages or like products having uniform weights, and fail to stuff sausage material into casings at high speeds, since the linking machine 12 is driven by the motor through the speed reducer and the speed change device, and the pump shaft 21 for the pump 5 rotates at a constant speed.

The problem that sausages of uniform weights cannot be produced will be described with reference to FIGS. 1 and 4. Rotative power from the motor 16 is supplied to the linking device 12, the casing chuck 10 and the other parts through the speed reducer 20 and then the stepless speed change device 26. With such an arrangement, the stepless speed change device 26 is reduced in its speed of rotation and cannot fully transmit an increased drive torque and is likely to cause irregular power transmission due to a belt slip, so that the linking device 12 will not operate at a constant speed. Uneven speeds of operation of the linking device 12 result in irregular weights or volumes of sausage dough stuffed in links.

The difficulty that sausage material cannot be stuffed into a casing at a high speed arises out of the fact that the pump fails to operate at different speeds. Such a shortcoming will now be described in detail.

The allowable maximum speed of operation of the apparatus, that is, the allowable maximum speed at which the sausage dough is extruded into the casing while at the same time the latter as stuffed is twisted to produce links of desired lengths, is dependent on the properties of the casing used, that is, the mechanical strength and rigidity of the casing. With the prior apparatus, the allowable maximum speed of operation can be set as desired by controlling the stepless speed change device 26, but changing the amount of a sausage mixture discharged from the pump 5 requires that the pump gear 5a be replaced with a different one because of constant-speed rotation of the pump shaft 21. The amount of the material fed from the pump 5 can thus be varied only stepwise in increments, but not continuously. This means that the pump 5 is unable to discharge and stuff sausage dough in the amount a casing can take or needs while the apparatus is operating at an allowable maximum speed which is determined by the casing used.

The above shortcoming will be described in more detail with reference to FIG. 5.

It is assumed that the amount of a sausage material a casing needs and the amount of sausage dough the pump can supply or stuff are indicated respectively by $Q_0$, $Q$ at the maximum speed of operation of the apparatus which the casing employed allows. As shown in FIG. 5, the amount $Q$ of sausage dough discharged from the pump can vary stepwise as indicated by hatched areas A, B, C, and D, whereas the amount $Q_0$ needed by casings is substantially continuously variable since a wide variety of casings are available (In FIG. 5, however, the amount $Q_0$ is shown as being stepped in small increments for the ease of illustration).

The amounts $Q$, $Q_0$ should meet the relationship of $Q \leq Q_0$ to avoid breakage of casings due to overstuffing. Therefore, the speed of operation of the apparatus, that is, the speed of travel of a casing selected, is governed by the amount $Q$ of sausage batter dischargeable by the pump, and hence is usually below the allowable maximum operating speed the used casing permits.

Figure 5:
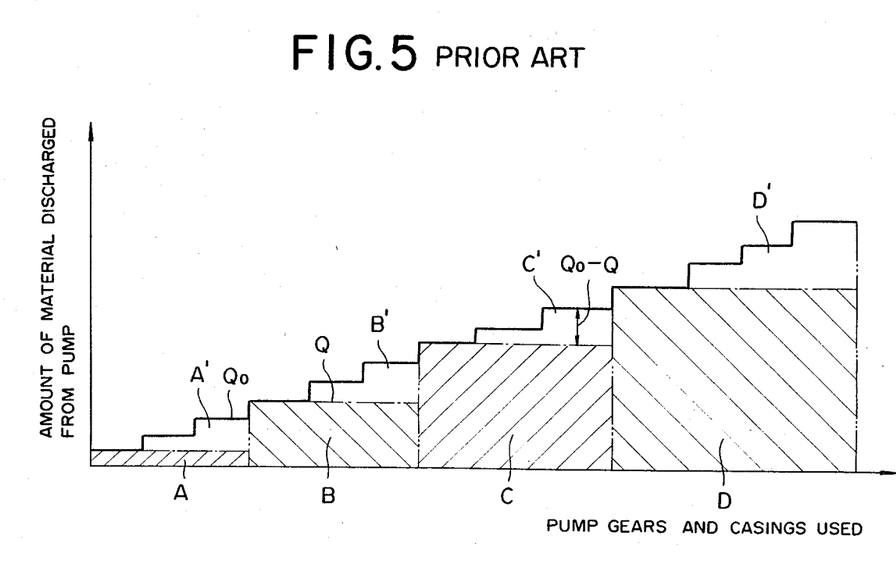
FIG. 5 is a graph showing differences between amounts of sausage mix dischargeable from a pump and amounts of sausage mix that can be stuffed into a casing.

In FIG. 5, the shaded areas A through D indicated, as mentioned before, amounts of sausage dough, respectively, fed from the pump 5 with different (four in the illustrated arrangement) pump gears 5a changed successively. Blank areas A' through D' denote differences between amounts of sausage mix the casings need and amounts of sausage mix the pump 5 can actually supply to the casings while the apparatus is operating at maximum speeds the used casings allow. The difference $Q_0 - Q$ is indicative of a difference between the possible operating speed and the actual operating speed, that is, a reduction in the operating speed due to the inability of the pump to change its speed of operation.

As described above, the prior apparatus including fully automatic sausage manufacturing apparatus are defective in that they are required to operate at speeds lower than allowable maximum operating speeds.

Besides the fully automatic apparatus described above, there have been produced and sold semiautomatic sausage producing apparatus (which fall in the category of a "single-purpose machine"), and versatile sausage producing apparatus in which a casing can by driven or propelled either manually or automatically by a cylinder.

Difficulties of the known semiautomatic and versatile apparatus will briefly be described.

In the semiautomatic apparatus, the operator is required to operate a casing pusher, place a casing between casing clamps, operate the clamps, a stuffer tube, start and stop a pump and a motor, all by hand, and the stuffer tube continues to rotate at all times during operation of the apparatus. Other structures and ways of operation of the semiautomatic apparatus are the same as those of the fully automatic apparatus. The semiautomatic apparatus is disadvantageous in that it is unsuitable for the production of sausages of irregular volumes using natural casings, fails to produce sausages of equal weights, cannot stuff sausage material into a casing at high speeds, and suffers a low rate of production due to manual operation required.

The versatile apparatus is constructed such that it is capable of manufacturing sausages with those casings which the fully automatic apparatus fails to use. In the versatile apparatus, a stuffer tube rotates continuously during operation of the apparatus, a casing may be propelled either manually or automatically by a cylinder, and the apparatus is functionally equivalent to the fully automatic apparatus plus the semiautomatic apparatus. Problems experienced with the versatile apparatus are as follows: It operates at speeds lower than those at which the fully automatic apparatus operate. The versatile apparatus also shares the difficulties with the semiautomatic apparatus except for the low production rate resulting from manual operation. Since the second and third defects set forth above that the semiautomatic apparatus suffers have already been described above with respect to the description of the problems with the fully automatic machine, only the first shortcoming of the versatile apparatus will be described.

Animal or natural sausage casings such as sheep guts or hog guts have uneven diameters, which are irregular to the extent that the cross-sectional area at a large-diameter portion is about twice as large as that at a small-diameter portion. In order to stuff sausage dough into such a casing having irregular cross-sectional areas with a uniform stuffing density (which can be expressed by an amount of material stuffed divided by a unit volume of the casing), the following requirement should be met: It is possible to adjust the speed of operation of the linking device while sausage material is being extruded into the casing so as to gain an even stuffing density. In order to stuff the sausage dough, with a uniform density, into the casing with the maximum ratio between different cross sections being about 2, the speed of operation of the linking device should be adjustable in such a range that the maximum speed is twice as high as the minimum speed. Although the speed of operation of the linking device should be determined by the strength of a casing used to achieve a high rate of production, the conventional apparatus is required to operate in a large speed range including a speed that is half the speed at which sausage dough can be stuffed into a casing, for the reason mentioned above.

The above requirement does not lead to a high production rate, and tends to result in various problems such as a casing breakage due to a variation in the speed of movement of the casing out of the casing chuck. The prior versatile apparatus is therefore not suitable for the production of sausages having natural casings.

A sausage manufacturing apparatus according to an embodiment of the present invention will now be described with reference to FIGS. 6 through 8. Like or identical parts shown in FIGS. 6 through 8 are denoted by like or identical reference numerals illustrated in FIGS. 1 through 3.

Figure 6:
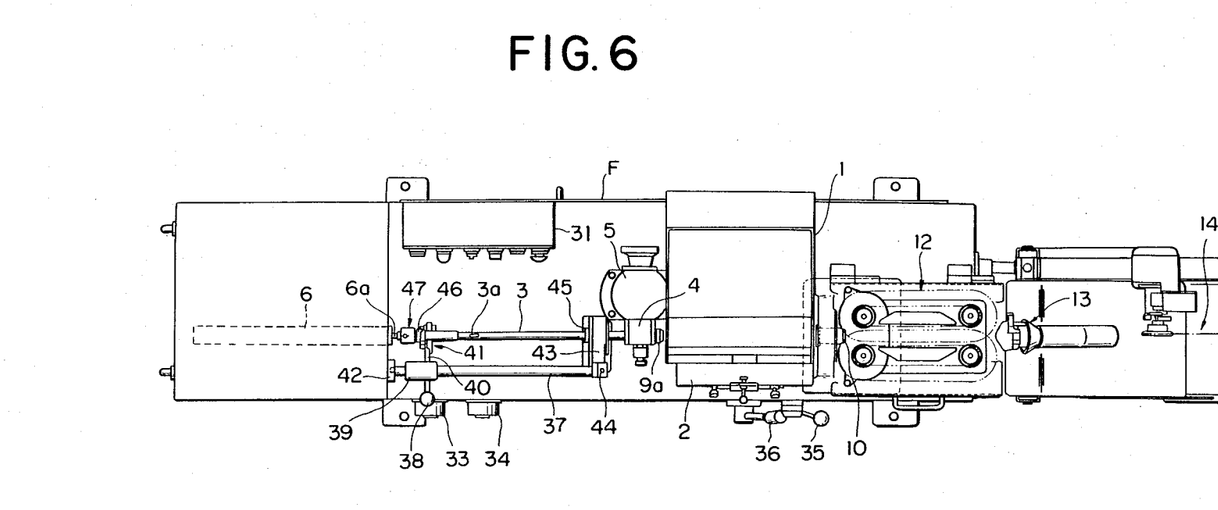
FIG. 6 is a plan view of an apparatus for manufacturing sausages or the like according to the present invention.
Figure 7:
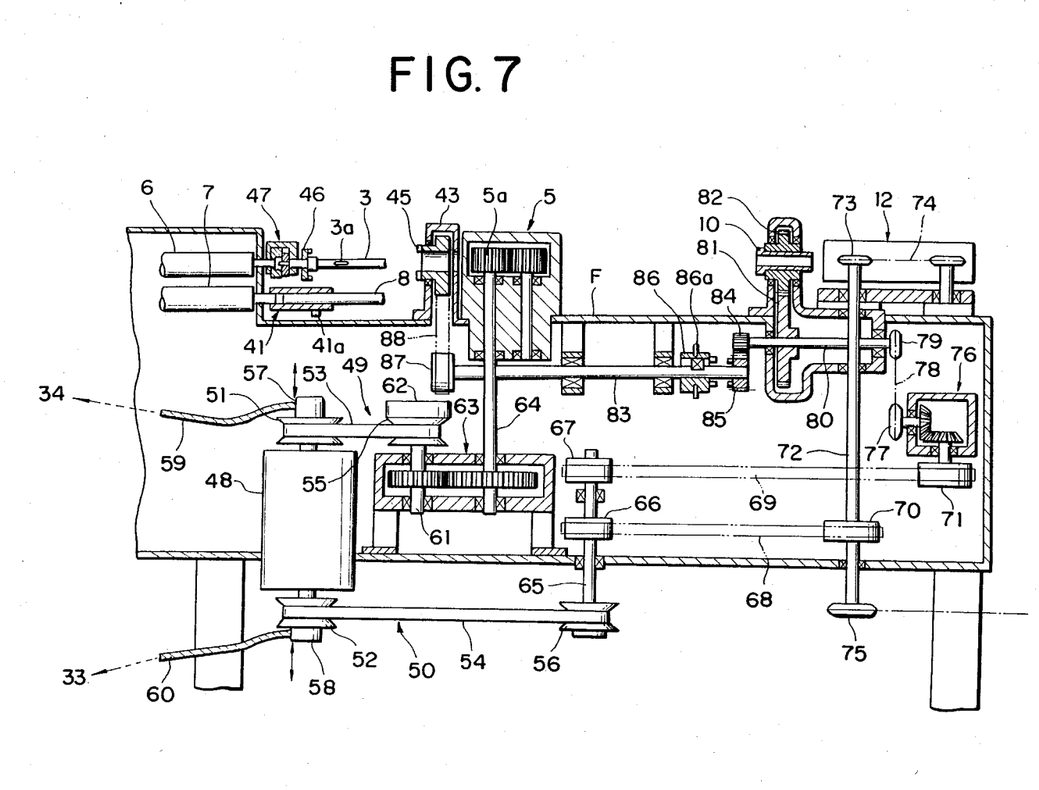
FIG. 7 is a cross-sectional view of a portion of the apparatus shown in FIG. 6.
Figure 8:
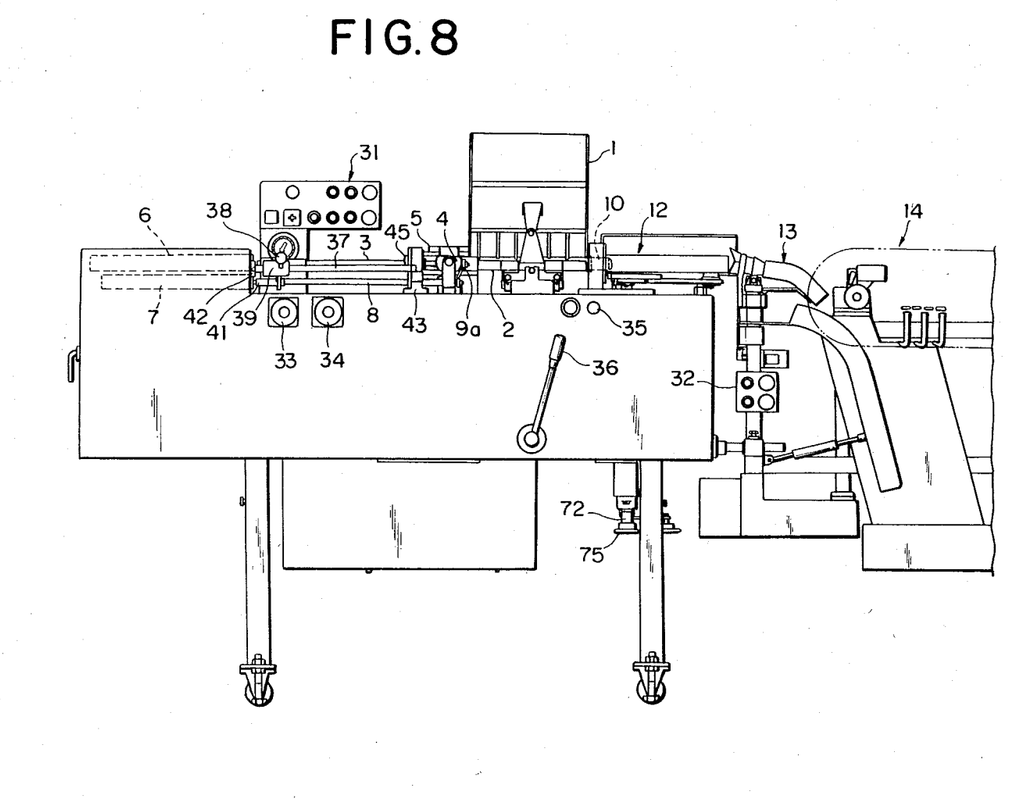
FIG. 8 is a front elevational view of the apparatus illustrated in FIG. 6.

The apparatus shown in FIGS. 6 through 8 comprises a casing hopper 1, casing clamps 2, a stuffer tube 3, a stuffer block 4, a pump 5, a cylinder 6 for propelling the stuffer tube 3, a cylinder 7 for driving a casing pusher rod 8, a collar 9a for supporting a casing pusher 9, a casing chuck 10, a linking device 12, a looper 13, and a loop conveyor 14. A control panel 31 for controlling operation of the apparatus is mounted on a frame F. Another control panel 32 is provided below the looper 13 as shown in FIG. 8. The control panel 32 allows the operator to control the apparatus while the operator is standing in front of the looper 13. The apparatus of the present invention is elongate in a horizontal sense. If the apparatus were provided with a single control panel somewhere along the length thereof, it would take the operator a relatively long time to reach the control panel if the operator were away from the control panel. According to the present invention, the two control panels 31, 32 which have similar control functions are located at areas where the operator is likely to stand during operation of the apparatus. Provision of three or more such control panels would result in an increases in the cost of manufacture of the apparatus. Each of the control panels 31, 32 has a switch for starting fully automatic operation, a switch for stopping the fully automatic operation, a switch for stopping the apparatus in emergencies, and other switches and indicators. These switches and associated electrical circuits can easily be designed by those skilled in the art, and have no direct bearing on the present invention. The frame F supports on its front face a speed adjustment handle 33 for selecting speeds of operation of the linking device 12, the looper 13, and the loop conveyor 14, and a discharge adjustment handle 34 for selecting speeds of rotation of the pump 5 and hence amounts of sausage batter dischargeable by the pump 5. A selection lever 35 for selecting a rotation or nonrotation mode of the stuffer tube 3, and a start lever 36 for starting the apparatus for semiautomatic operation are also mounted on the frame F at its front face on the right as shown in FIG. 8.

A guide bar 37 with splines is detachably mounted on an upper surface of the frame F and extends parallel to the stuffer tube 3. A slide sleeve 39 is slidably fitted over the guide bar 37 and has a casing pusher handle 38 secured to the sleeve 39. An arm 40 projects from the slide sleeve 39 and is detachably connected as by a setscrew to a coupling 41 fitted over the casing pusher rod 8. The guide bar 37 has one end removably inserted through a hole in a boss 42 (see also FIG. 11) mounted on the frame F, and the other end detachably fastened as by a setscrew 51 to a housing 43 mounted on the frame F and in which the stuffer tube 3 is rotatably supported. The housing 43 accommodates therein a rotatable clutch member 45 which is meshingly engageable with a clutch member 46 fixed to a proximal end of the stuffer tube 3. The stuffer tube 3 is supported on a piston rod 6a of the cylinder 6 by a rotatable coupling 47 attached to the proximal end of the stuffer tube 3 which is rotatable only when the cylinder 6 extend and the clutch member 46 engages with the clutch member 45.

Principal parts of the apparatus according to the present invention will be described with reference to FIGS. 7 and 9 through 11.

In FIG. 7, a sole electric motor 48 serves to supply power to all moving parts of the apparatus. Rotative power from the ends of an output shaft of the motor 48 is transmitted to a stepless speed change device 49 for changing the speed of operation of the pump 5 and to a stepless speed change device 50 for changing the speeds of operation of other parts. The stepless speed change devices 49, 50 comprise drive conical pulleys 51, 52, V-belts 53, 54, and driven conical pulleys 55, 56. Sliders 57, 58 mounted respectively on the driven conical pulleys 51, 52 are coupled through flexible shafts 59, 60 to the adjustment handles 34, 33, respectively. The driven conical pulley 55 of the stepless speed change device 49 is mounted on an input shaft 61 of a speed reducer 63. An electromagnetic clutch 62 is mounted on the conical pulley 55 for selectively starting or stopping operation of the pump 5. The speed reducer 63 includes an output shaft 64 operatively coupled with the input shaft 61 through a pair of meshing speed reducing gears. Rotative power from the speed change device 49 is transmitted through the input and output shafts 61, 64 to a pump gear 5a affixed to the output shaft 64.

The stepless speed change device 50 has an output shaft 65 which serves as a main shaft having a pair of spaced pulleys 66, 67 from which rotative power is transmitted to driven pulleys 70, 71, respectively, via endless belts 68, 69. The pulleys 66, 70 and the belt 68 jointly constitute a speed reducer to reduce the speed of rotation as transmitted from the stepless speed change device 50 before the rotative power is transmitted to other parts.

The pulley 70 is mounted on a main shaft 72 of the linking device 12. Power is transmitted from a sprocket 73 attached to the main shaft 72 to a chain 74 of the linking device 12. To allow the looper 13 and the loop conveyor 14 to be coupled to the apparatus and to be driven therewith, the shaft 72 may have a sprocket 75 for transmitting power to the looper 13 and the conveyor 14.

The pulley 71 is mounted on an input shaft of a bevel gear unit 76, which has an output shaft from which rotative power is transmitted to a horizontal shaft 80 via a sprocket 77, a chain 78 and a sprocket 79. A gear 81 is affixed to the horizontal shaft 80 and is held in driving mesh with a gear 82 in which the casing chuck 10 is fixedly mounted. The horizontal shaft 80 has a gear 84 fixed thereto and meshing with a gear 85 with a clutch member loosely fitted over a shaft 83 extending parallel to the horizontal shaft 80. The shaft 83 has a clutch member 86 slidably mounted thereon and engageable with the clutch member on the gear 85. The clutch member 86 is operatively connected through a suitable means to the selection lever 35. The clutch member 86 is thus slidable on the shaft 83 in response to actuation of the selection lever 35. The shaft 83 supports on its end remote from the clutch member 86 a pulley 87 around which there is entrained a belt 88 through which rotative power from the shaft 83 is transmitted to the clutch member 45 for the stuffer tube 3. The clutch 45 is in the form of a hollow cylinder integral with a pulley around which the belt 88 is trained, and is disposed in the housing 43.

The stuffer tube 3 is rotatable only when the cylinder 6 extends and the clutch member 46 engages with the clutch member 45. The clutch members 85 and 86 are "on" or "off" by the selection lever 35 which render said members 85 and 86 selectively rotatable or nonrotatable. Every time the clutches 85 and 86 engage with each other, the shaft 83, the pulley 87, the belt 88 and the clutch 45 rotate, but the clutch 46 and the stuffer tube 3 do not rotate.

Figure 9:
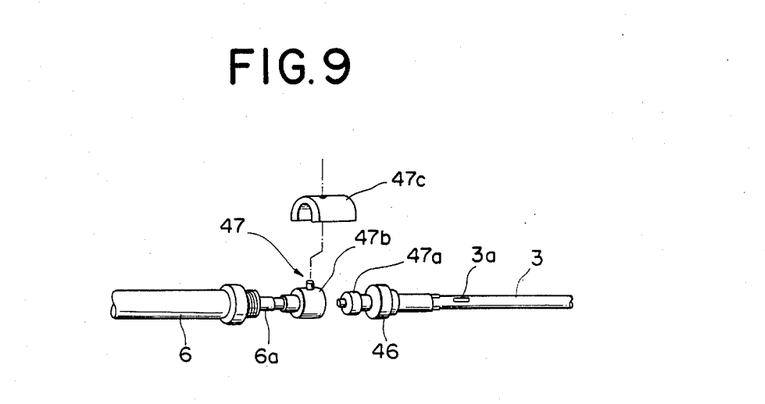
FIGS. 9 through 12 are perspective views of various parts of the apparatus shown in FIG. 6.

FIG. 9 is an exploded perspective view of the rotatable coupling 47 by which the stuffer tube 3 and the piston rod 6a of the cylinder 6 are connected to each other. The stuffer tube 3 is held by the rotatable coupling 47 so as to be rotatable relatively to the piston rod 6a as well as be axially coupled thereto. The rotatable coupling 47 comprises a bearing 47a loosely fitted over the proximal end of the stuffer tube 3 for rotatably supporting proximal end thereof, a cylindrical housing 47b fixed to the piston rod 6a in axially confronting relation to the bearing 47a, and a cover 47c fastened to the housing 47b.

Figure 10:
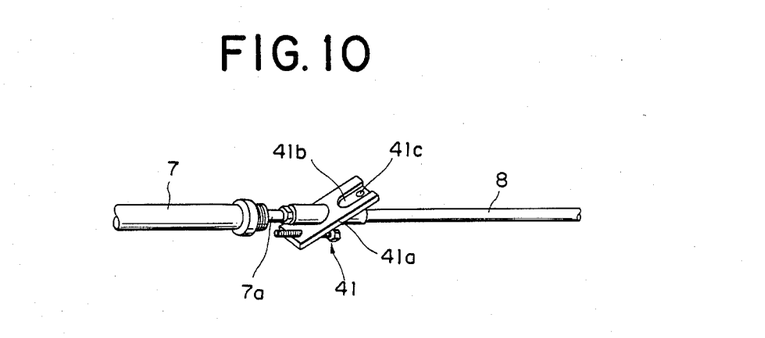
Figure 11:
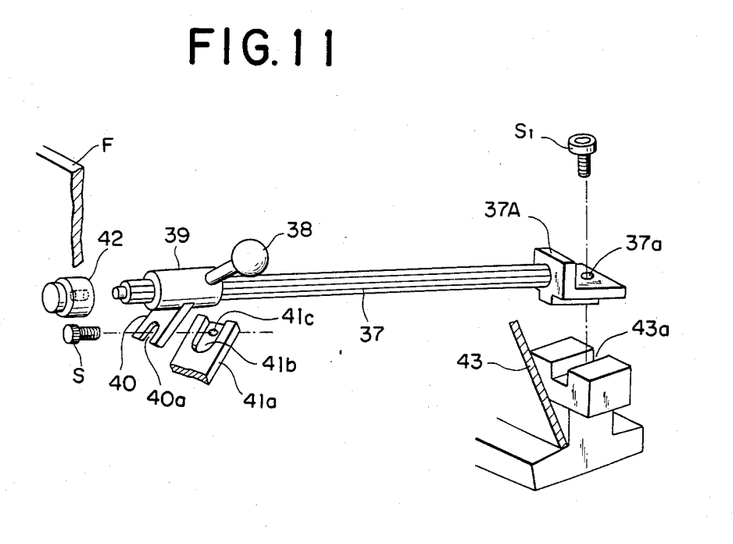

FIG. 10 is a perspective view of the coupling 41 which connects the piston rod 7a of the cylinder 7 to the casing pusher rod 8. The coupling 41a includes a lateral arm 41a having a longitudinal slot 41b with a threaded hole 41c defined through a bottom of the slot 41b. As shown in FIG. 11, the arm 41a is connected to the arm 40 of the slide sleeve 39 on the guide bar 39, the arm 40 having a recess 40a aligned with the slot 41b for insertion therethrough of a screw S. For assembly, the arm 41a of the coupling 41 is brought into overlapping relation to the arm 40 of the slide sleeve 39, and the screw S is threaded through the recess 40a into the threaded hole 41c in the arm 41a, thereby fastening the arms 41a, 40 together.

As illustrated in FIG. 11, the guide bar 37 has on the other end thereof an attachment 37A having a downward projection which is fitted in a groove 43a in the housing 43 in which the stuffer tube 3 is rotatable. A screw $S_1$ is threaded through a hole 37a in the attachment 37A into a threaded hole (not shown) in the bottom of the groove 43 in the housing 43. The guide bar 37 thus mounted on the housing 43.

Figure 12:
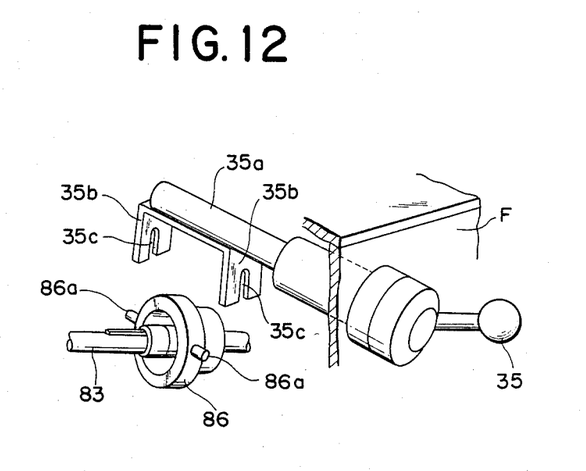

FIG. 12 is an exploded perspective view showing an arrangement in which the clutch member 86 shown in FIG. 7 is coupled to the selection lever 35 illustrated in FIG. 8. According to the illustrated embodiment, the selection lever 35 has a rotatable shaft 35a to which there is attached a pair of brackets 35b having oblong holes 35c, respectively, receiving therein a pair of diametriacally oppsite pins 86a, respectively, projecting radially outwardly from the clutch member 86. When the lever 35 is angularly moved to turn the rotatable shaft 35a about its own axis, the clutch member 86 is axially alid along the shaft 83.

The apparatus thus constructed for manufacturing sausages or the like is capable of effecting the following selections and settings:

(1) Selection of rotation or nonrotation of the stuffer tube;
(2) Selection of automatic propulsion or manual propulsion of the casing pusher;
(3) Desired setting of an amount of sausage mix dischargeable by the pump through rotation of the pump at varying speeds; and
(4) Desired setting of a speed at which sausage dough is stuffed into a casing through operation of the linking device at varying speeds.

By combining the selections (1) and (2) as desired, the apparatus can be operated in the following four different modes depending on the kinds of casings used.

Operation mode 2:

In this mode, sausages with collagen casings having a relatively large rigidity can be manufactured. The guide bar 37 is first removed from the frame F. Then, the adjustment handle 33 is manipulated to set the stepless speed change device 50 for the maximum operating speed allowed by a casing used, and the adjustment handle 34 is manipulated to set the speed change device 49 to determine a speed of rotation of the pump 5 for stuffing sausage batter in the amount the casing can take while the apparatus operates at the established maximum allowable speed. The selection lever 35 is actuated to bring the clutch member 85 into meshing engagement with the clutch member 86. Then, the operation mode selection switch on the control panel 31 is switched to "automatic operation" to put an apparatus control circuit in an automatic control mode. After the foregoing controlling operations have been effected, a motor start switch on the control panel 31 is depressed to enable the apparatus to start predetermined cycles of operation. The apparatus will continue to operate until all casings in the casing hopper 1 are stuffed with sausage dough and twisted into linked sausages, and then will automatically be stopped. In this operating mode, a casing with no sausage dough stuffed therein is caused to rotate with the stuffer tube 3, and hence undergoes no risk of getting damaged thereby. Since the collagen casings used are of a relatively large rigidity, they can automatically be propelled.

Operation mode 4:

This operation mode enables the apparatus to produce sausages with soft natural casings having irregular diameters or collagen casings of a very small rigidity. With the guide bar 37 mounted on the frame F, the arm 40 of the slide sleeve 39 is coupled to the arm 41a of the coupling 41. Using the same procedure as that in the operation mode 2, the clutch member 86 is brought in mesh with the clutch member 85, and a speed of operation of the apparatus and an amount of sausage material to be discharged from the pump or a speed of rotation of the pump 5 are established by setting handles 33 and 34. Then, the operation mode switch on the control panel 31 is switched to "semiautomatic operation" to set the

| Casing types | Operation modes | Casing Propulsion | Stuffer tube | Pump | Linking device |
| --- | --- | --- | --- | --- | --- |
| Hard cellulosic casing | 1 | Automatic | Non-rotatable | Variable speed | Variable speed |
| Collagen casing of a relatively large rigidity | 2 | Automatic | Rotatable | (Variable amounts dischargeable | |
| Collagen casing of a relatively small rigidity | 3 | Manual | Non-rotatable | | |
| Collagen casing of a very small rigidity Flaccid natural casing of uneven diameters | 4 | Manual | Rotatable | | |

As is apparent from the above table, the apparatus according to the present invention can produce sausages or the like under optimum operating conditions which are selectively available for all kinds of sausage casings. The apparatus is capable of manufacturing sausages of uniform volumes using natural casings which the conventional apparatus have failed to produce effectively.

Operation of the apparatus will be described with reference to FIGS. 6 through 12.

apparatus control mode for a semiautomatic control mode. With the above setting, a chamber in the cylinder 7 is vented to the atmosphere by a solenoid-operated valve (not shown), thus rendering a piston in the cylinder 7 free. The casing pusher rod 8 is now manually actuatable. (The casing pusher rod 8 may instead be disconnected from the cylinder 7 for manual operation of the casing pusher rod 8.)

Thereafter, the start lever 36 on the front face of the frame F is manipulated to start semiautomatic operation of the apparatus for a predetermined cycle, which will be completed when a casing on the stuffer tube is fully stuffed with sausage mix and twisted into sausage links. During the operation, only the propulsion of the casing is performed by hand. With this mode of operation, the casing is manually driven so that it will not be damaged even if it is a soft sheep gut, for example. The amount of sausage dough dischargeable from the pump, or the speed of operation of the pump, may gradually be changed to process a natural casing having uneven diameters.

Since the manners of control and operation in the operation modes 1 and 3 are substantially the same except that selection lever 35 is not caused to engage the clutches 85 and 86 as those in the modes 2 and 4, the modes 1 and 3 will not be described herein.

Figure 13:
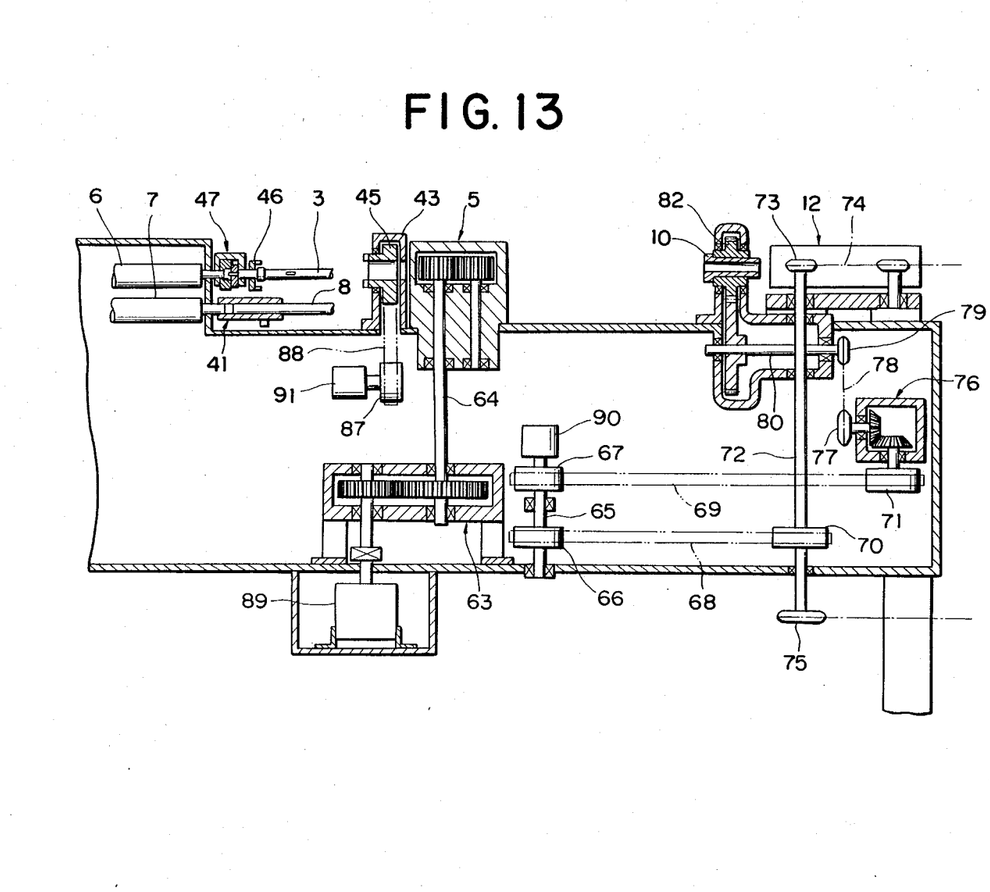
FIG. 13 is a view similar to FIG. 7, showing an apparatus according to another embodiment.

FIG. 13 shows a drive mechanism according to another embodiment of the present invention. Like or identical parts illustrated in FIG. 13 are denoted by like or identical reference numerals shown in FIG. 7.

In FIG. 13, variable-speed motors 89, 90 are controlled to operate in synchronization with each other so that a selected ratio between their speeds of rotation will remain unchanged throughout the operation of the motors 89, 90. An electric motor 91 which may be of either the constant-speed type or the variable-speed type is operatively coupled to the clutch member 45 so that selective energization or de-energization of the motor 91 causes the stuffer tube 3 to rotate or stop, that is, allows switching between rotation or nonrotation of the stuffer tube 3.

With the arrangement of the present invention, the four operation modes of the apparatus are available through a desired combination of automatic or manual propulsion of the casing and rotation or nonrotation of the stuffer tube, and the speeds of operation of the pump and the linking device can be varied.

The apparatus according to the present invention can thus manufacture sausages or the like of ununiform volumes at high speeds using natural or animal casings such as sheep guts and hog guts, which conventional apparatus have been unable to use. The apparatus of the invention also can produce sausages or similar products of even volumes with artificial casings such cellulosic casings and collagen casings at higher speeds than the prior apparatus. Since the apparatus of the invention can singly be relied upon to use all kinds of sausage casings, the rate of efficiency or performance to investment for the apparatus is increased. Where artificial casings are to be used, the apparatus of the invention can produce sausages of more uniform weights than known apparatus. The apparatus according to the present invention can be controlled with more ease, is available for more manufacturing operations, and hence can manufacture sausages or the like at higher rates of production.

The above advantages accruing from the apparatus of the present invention will be described in more detail.

Conventional apparatus, such as fully automatic, semiautomatic, and versatile apparatus, are designed for mass-producing sausages of constant volumes using such artificial casings as cellulosic and collagen casings, but not for manufacturing sausages with natural or animal casings.

With the present invention, the apparatus has the variable-speed pump which enables mass production of sausages of irregular volumes using natural casings that the prior apparatus have failed to handle.

In order to produce sausages of uniform densities of stuffed material using animal casings of irregular diameters, the prior apparatus have been adjusted to change the speed of operation of the linking device such that the apparatus will have to operate at a speed much lower than the allowable maximum speed the casing used can take to prevent the casing which is relatively weak from being ruptured due to the speed change. Attempts to produce sausages with natural casings at higher speeds on the known apparatus have been likely to result in ruptures of the casing used. According to the apparatus of the present invention, the speed of operation of the linking device is first selected so as to be equal to the maximum speed of operation which the casing used permits, and then the amount of sausage dough dischargeable from the pump is adjusted to suit variations in the diameter of the casing, an arrangement which can avoid the difficulties experienced with the conventional sausage manufacturing apparatus. Thus, the apparatus of the invention can mass-produce sausages or like products of uneven volumes with sausage dough stuffed in uniform densities. Where artificial casings are to be employed, the speed of operation of the apparatus can be selected so as to be closer to the allowable maximum speed of operation that the casing employed can provide, resulting in a more increased rate of production at high speeds.

The apparatus of the invention has functions of both the fully automatic apparatus and the semiautomatic apparatus, and at the same time can have independent modes of operation which the prior apparatus have failed to provide. The apparatus of the invention is highly economical in that only a singly such apparatus can produce a wide variety of sausages under their respective manufacturing conditions.

With the conventional apparatus, the speed change device is subjected to slippage of a power transmission belt due to an increased torque to be transmitted because a speed reduction is followed by a speed change. In the apparatus of the invention in which a speed change is effected prior to a speed reduction, the speed change device rotates at a higher speed, and hence no belt slippage occurs as the transmitted torque is relatively small, resulting in no relative difference between the speeds of operation of the pump and the linking device. Such a feature enables production of sausages or similar products having uniform weights.

Since the two control panels are separately provided, control operations can be carried out at spaced locations with the results that the working time can be reduced and the availability of the apparaus can be increased. The availability of the apparatus is also improved as the apparatus has more automatically operated parts than prior semiautomatic apparatus.

Although certain preferred embodiments have been shown and descirbed in detail, it should be understood that various changes and modifications may be made therein without departing from the scope of the appended claims.

What is claimed is:

1. An apparatus for manufacturing sausages or the like comprising: a stuffer tube for stuffing dough into a casing; a pump for continuously discharging the dough to supply the dough into the stuffer tube; a casing pusher for propelling the casing; a chuck for receiving the stuffed casing from a discharging end of said stuffer tube, said chuck having means for frictionally engaging a part of said casing; and a linking device coacting with said chuck for twisting the stuffed casing as pushed out of said chuck into a chain of links, first means for manually changing the speed of rotation of said pump independently of said linking device; second means for manually changing the speed of operation of said linking device independently of said first means; third means for propelling said casing selectively automatically or manually; and fourth means for rendering said stuffer tube selectively rotatable or nonrotatable; said pump having a speed reducer in turn having an input shaft and an output shaft; a single motor for driving said pump and said linking device, said motor having an output shaft having oppositely projecting ends; said first means comprising a pump speed change device including a first conical pulley mounted on one of said ends of the output shaft of said motor, a second conical pulley mounted on said pump speed reducer input shaft, and a first endless belt entrained around said first and second conical pulleys; said second means comprising a linking device speed change device including a third conical pulley mounted on the other end of the output shaft of said motor, a fourth conical pulley mounted on an end of a further output shaft for driving said linking device and rotating said stuffer tube, and a second endless belt entrained around said third and fourth pulleys, said pump reducer comprising a pair of intermeshing gears mounted respectively on said pump speed reducer input shaft and output shaft for driving said pump, and therewith for reducing the speed of rotation of said pump after a speed change has been effected by said pump speed change device; and a linking device speed reducer comprising a first pulley mounted on said further output shaft, a second pulley mounted on a driving shaft for driving the linking device, and third endless belt entrained around said first and second pulleys for reducing the speed of operation of said linking device after a speed change has been effected by said linking device speed change device; said third means comprising a first fluid cylinder having a piston rod, a casing pusher rod connected to said piston rod for being operated thereby, a first manually operable handle connected to said casing pusher rod and guided by a guide bar extending parallel to said stuffer tube, and a semiautomatic control circuit for venting said fluid cylinder to atmosphere to allow said piston rod to be manually movable reciprocally when said casing is selected to be manually propelled; said fourth means comprising a clutch shaft rotatable in response to said further output shaft, a first clutch having an integral pulley and comprising a hollow tubular body rotatable by said clutch shaft, a second clutch mounted on said stuffer tube for meshing engagement with said first clutch to rotate said stuffer tube, and a second manually operable handle for operating third and fourth clutches mounted on said clutch shaft to render said first clutch selectively rotatable or nonrotatable; and a second fluid cylinder having a nonrotatable rod for propelling said stuffer tube, said rod and said stuffer tube being coupled by a bearing which allows said stuffer tube to be rotated and transmits a propulsion force from said nonrotatable rod to said stuffer tube.

* * * * *

UNITED STATES PATENT AND TRADEMARK OFFICE
CERTIFICATE OF CORRECTION

PATENT NO. : 4 539 796
DATED : September 10, 1985
INVENTOR(S) : Minoru NAKAMURA et al It is certified that error appears in the above-identified patent and that said Letters Patent is hereby corrected as shown below:

Column 13, line 28; after "pump" insert ---speed---.

Signed and Sealed this

Nineteenth Day of November 1985

[SEAL]

Attest:

Attesting Officer

DONALD J. QUIGG

Commissioner of Patents and Trademarks